United States Patent
Banzon et al.

(10) Patent No.: US 7,774,304 B2
(45) Date of Patent: Aug. 10, 2010

(54) METHOD, APPARATUS AND PROGRAM STORAGE DEVICE FOR MANAGING BUFFERS DURING ONLINE REORGANIZATION

(75) Inventors: Arnold T. Banzon, Daly City, CA (US); Craig A. Friske, Morgan Hill, CA (US); John M. Garth, Gilroy, CA (US); Ka C. Ng, San Francisco, CA (US); James A. Ruddy, San Jose, CA (US); Bituin B. Vizconde, Daly City, CA (US)

(73) Assignee: International Business Machines Corporation, Armonk, NY (US)

(*) Notice: Subject to any disclaimer, the term of this patent is extended or adjusted under 35 U.S.C. 154(b) by 1593 days.

(21) Appl. No.: 11/048,341

(22) Filed: Jan. 31, 2005

(65) Prior Publication Data
US 2006/0173922 A1    Aug. 3, 2006

(51) Int. Cl.
*G06F 7/00* (2006.01)
*G06F 17/00* (2006.01)

(52) U.S. Cl. ............ 707/609; 718/100; 718/101; 718/102; 718/103; 718/104; 718/105; 718/106; 718/107; 718/108

(58) Field of Classification Search ............ None
See application file for complete search history.

(56) References Cited

U.S. PATENT DOCUMENTS

| | | | |
|---|---|---|---|
| 5,671,445 A * | 9/1997 | Gluyas et al. ............ 710/53 |
| 5,940,832 A * | 8/1999 | Hamada et al. ............ 707/100 |
| 5,991,520 A * | 11/1999 | Smyers et al. ............ 710/100 |
| 6,026,412 A | 2/2000 | Sockut et al. |
| 6,094,695 A * | 7/2000 | Kornher ............ 710/56 |
| 6,101,504 A * | 8/2000 | Gord ............ 707/201 |
| 6,131,094 A * | 10/2000 | Gord ............ 707/8 |
| 6,370,619 B1 * | 4/2002 | Ho et al. ............ 711/129 |
| 6,460,048 B1 | 10/2002 | Teng et al. |
| 6,519,613 B1 | 2/2003 | Friske et al. |
| 6,535,893 B1 | 3/2003 | Friske et al. |
| 6,591,269 B1 | 7/2003 | Ponnekanti |
| 6,732,124 B1 * | 5/2004 | Koseki et al. ............ 707/202 |
| 2002/0147736 A1 | 10/2002 | Isip, Jr. |
| 2003/0135478 A1 | 7/2003 | Marshall et al. |
| 2004/0015468 A1 | 1/2004 | Beier et al. |
| 2004/0122842 A1 | 6/2004 | Friske et al. |
| 2004/0221030 A1 | 11/2004 | Huras et al. |
| 2005/0146990 A1 * | 7/2005 | Mayer ............ 368/95 |

OTHER PUBLICATIONS

U.S. Appl. No. 09/501,493, filed Feb. 9, 2000, Garth, et al.
U.S. Appl. No. 10/926,591, filed Aug. 26, 2004, Seiffert et al.

* cited by examiner

*Primary Examiner*—Khanh B Pham
*Assistant Examiner*—Azam Cheema
(74) *Attorney, Agent, or Firm*—Gates & Cooper LLP

(57) ABSTRACT

A method, apparatus and program storage device for managing buffers during online reorganization. An adaptive buffer is provided having a dynamically adjustable boundary, the adaptive buffer processes log records and pointers associated with the log records during online reorganization of a database. Adaptive switching is provided between a first and a second task during the processing of data log records and index log records during the online reorganization of the database.

20 Claims, 13 Drawing Sheets

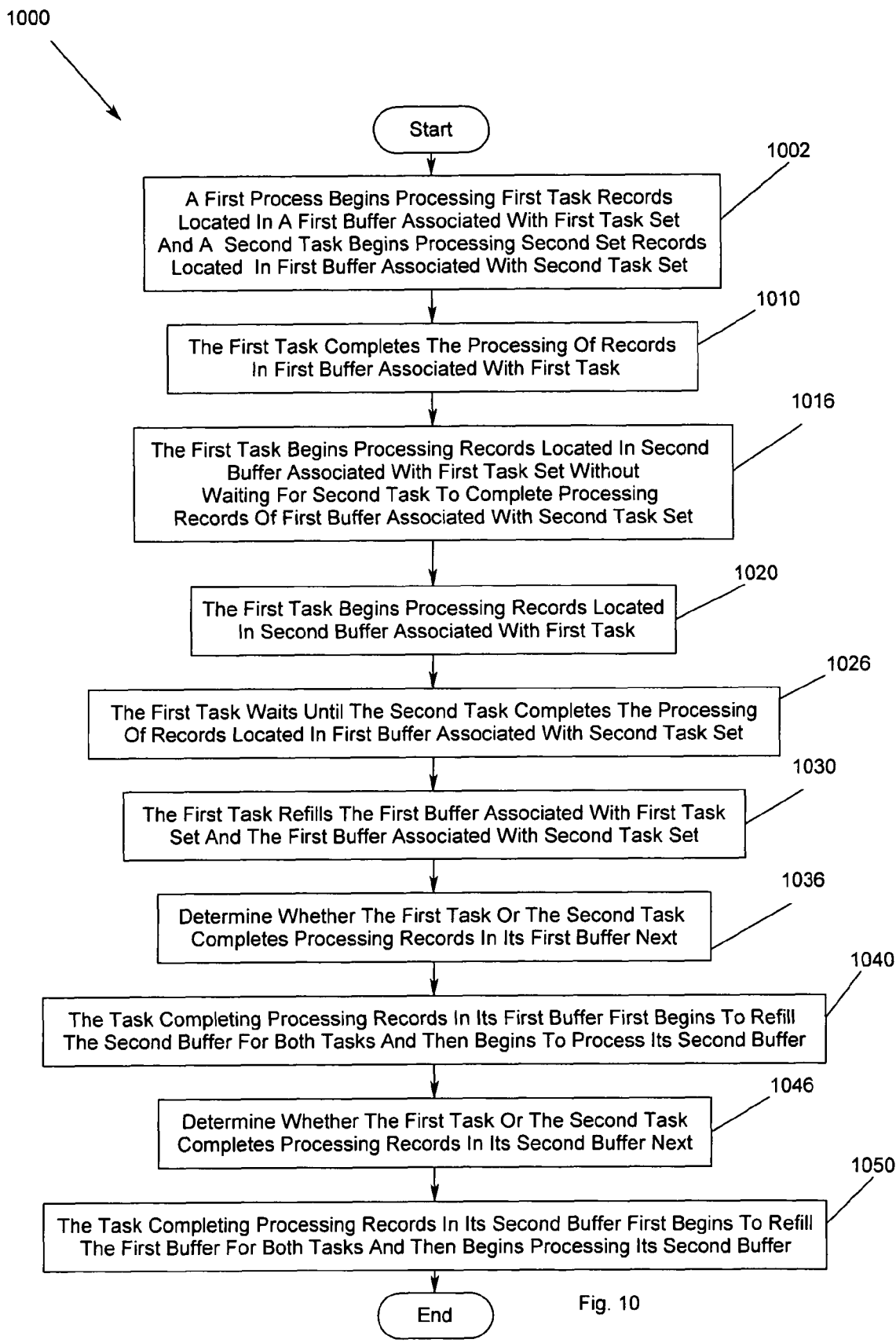

METHOD, APPARATUS AND PROGRAM STORAGE DEVICE FOR MANAGING BUFFERS DURING ONLINE REORGANIZATION

BACKGROUND OF THE INVENTION

1. Field of the Invention

This invention relates in general to computer-implemented database systems, and more particularly to a method, apparatus and program storage device for managing buffers during online reorganization.

2. Description of Related Art

Databases are computerized information storage and retrieval systems. A Relational Database Management System (RDBMS) is a database management system (DBMS) which uses relational techniques for storing and retrieving data. Relational databases are organized into tables that consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

A table can be divided into partitions, with each partition containing a portion of the table's data. By partitioning tables, the speed and efficiency of data access can be improved. For example, partitions containing more frequently used data can be placed on faster data storage devices, and parallel processing of data can be improved by spreading partitions over different DASD volumes, with each I/O stream on a separate channel path. Partitioning also promotes high data availability, enabling application and utility activities to progress in parallel on different partitions of data.

Indexing is a technique used by most current database management systems to speed up particular kinds of queries (usually by internally generating and storing redundant information to more quickly locate table entries). An index is an ordered set of references to the records or rows in a database file or table. The index is used to access each record in the file using a key (i.e., one of the fields of the record or attributes of the row).

Over time and with frequent use, databases often become disorganized. Constant additions, deletions and updates cause data to become disorganized. When that happens, retrieving data involves extensive CPU, I/O and elapsed time, costing time, money and end-user productivity. In turn, customers are lost and revenue decreases. To reduce these costs, data must be reorganized.

Accordingly, numerous attempts have been made to reorganize such databases. Reorganization of a database includes changing some aspect of the logical and/or physical arrangement of the database. Most database management systems (DBMS's) today provide some type of reorganizer utility that provides online reorganization capability.

Reorganizing a database can require significant time and usually involves taking the database offline. Reorganization of table spaces places data rows in clustering order and redistributes the rows on pages to optimize performance. With an online reorganization technique, where applications may access and update the data during the reorganization process, data rows may be unloaded from the source and reorganized into a "shadow" target table space partition(s) and index(es).

When online reorganization copies rows from the source table space and indexes into a shadow target, changes to the original rows occurring after being copied to the shadows, must be captured. This process occurs by reading changes from the log, and then applying them against the shadow objects.

In existing implementations, e.g., DB2 for z/OS, the log apply phase is a bit different for table space log records and index log records. An enhancement to the existing implementation allows multiple tasks for applying the log when reorganizing a subset of table space partitions. There is one log apply task for the table space partitions, and there can also be one log apply task for each NPI. The log phase uses two buffers for reading and applying log records for the table space partitions and non-partitioned indexes. While one buffer is being filled by the log read task a separate task or set of tasks apply the log records from a filled buffer.

A typical log apply implementation involves 1 object at most. If the reorganization is against a table space or subset of table space partitions, then only the log records for the target table space partitions are read and applied. During the log apply, a single buffer is filled with log records and pointers to those log records. Instead of sorting actual log records, to achieve better performance, the pointers to the log records are sorted. The log is read to fill the buffer, then the log records are sorted (by pointers), the log records are updated with new RID values, the log records are sorted again, and finally the log changes are applied. This process is a single serial phase within the reorganization utility.

A large buffer, e.g., 10 MB, may be allocated for pointers to log records and the log records themselves. The area allocated for pointers is much smaller, e.g., 1/16th that allocated for log records. However, depending on the size of the log records, space is typically wasted because either the pointer area or log record area filled first, so entire buffer is not used. The space wasted in the buffer, caused either by the pointer area filling up before the log record area is full, or the log record area filling up before the pointer area is full, causes the partially full buffer to be processed while there are additional log records waiting to be read. The inefficient use of the buffer means that additional log read iterations may be required, extending the elapsed time of the reorganization.

In addition, as mentioned above, changes to the original rows occurring after being copied to the shadows must be captured by reading data changes from the log, and then applying them against the shadow data objects and related indexes. When this capture process is complete, usage can be quickly switched from the original to the reorganized shadow.

For very large amounts of data, the data may be divided amongst many partitions and it may be possible to divide indexes on the data in the same way. Data divided this way allows a subset of the data partitions to be reorganized. However, it may be necessary to have a "global" index, which covers all of the partitions for purposes of enforcing unique values or providing efficient data retrieval. This complicates the use of the shadowing technique if only a subset of the global index is shadowed and in one implementation results in the shadow subset being used to update the original global index while disallowing any access to the global index.

Another technique is to shadow the entire global index so that usage of it can be quickly switched along with the partitioned data and partitioned indexes. This requires that the log records for the remainder of the partition related entries in the global index must be processed as well as the log records for the data being reorganized. Accordingly, multiple tasks are used in conjunction with multiple buffers for retrieval and processing of the log records for the data and global index. Depending on the level of activity of manipulation of the data partitions being reorganized and the data partitions not being reorganized, the data apply tasks or the index apply tasks may complete the processing of their current buffer significantly quicker than the other set.

It can be seen that there is a need for a method, apparatus and program storage device for managing buffers during online reorganization.

SUMMARY OF THE INVENTION

To overcome the limitations in the prior art described above, and to overcome other limitations that will become apparent upon reading and understanding the present specification, the present invention discloses a method, apparatus and program storage device for managing buffers during online reorganization.

The present invention solves the above-described problems by managing a buffer boundary and switching between tasks during online reorganization. An adaptive buffer is provided having a dynamically adjustable boundary, the adaptive buffer processes log records and pointers associated with the log records during online reorganization of a database. Adaptive switching is provided between a first and a second task during the processing of data log records and index log records during the online reorganization of the database.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 10 is a flow chart of the method for adaptive task switching during log apply for online reorganization according to an embodiment of the present invention.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for managing buffers during online reorganization. An adaptive buffer is provided having a dynamically adjustable boundary, the adaptive buffer processes log records and pointers associated with the log records during online reorganization of a database. Adaptive switching is provided between a first and a second task during the processing of data log records and index log records during the online reorganization of the database.

Figure 1:
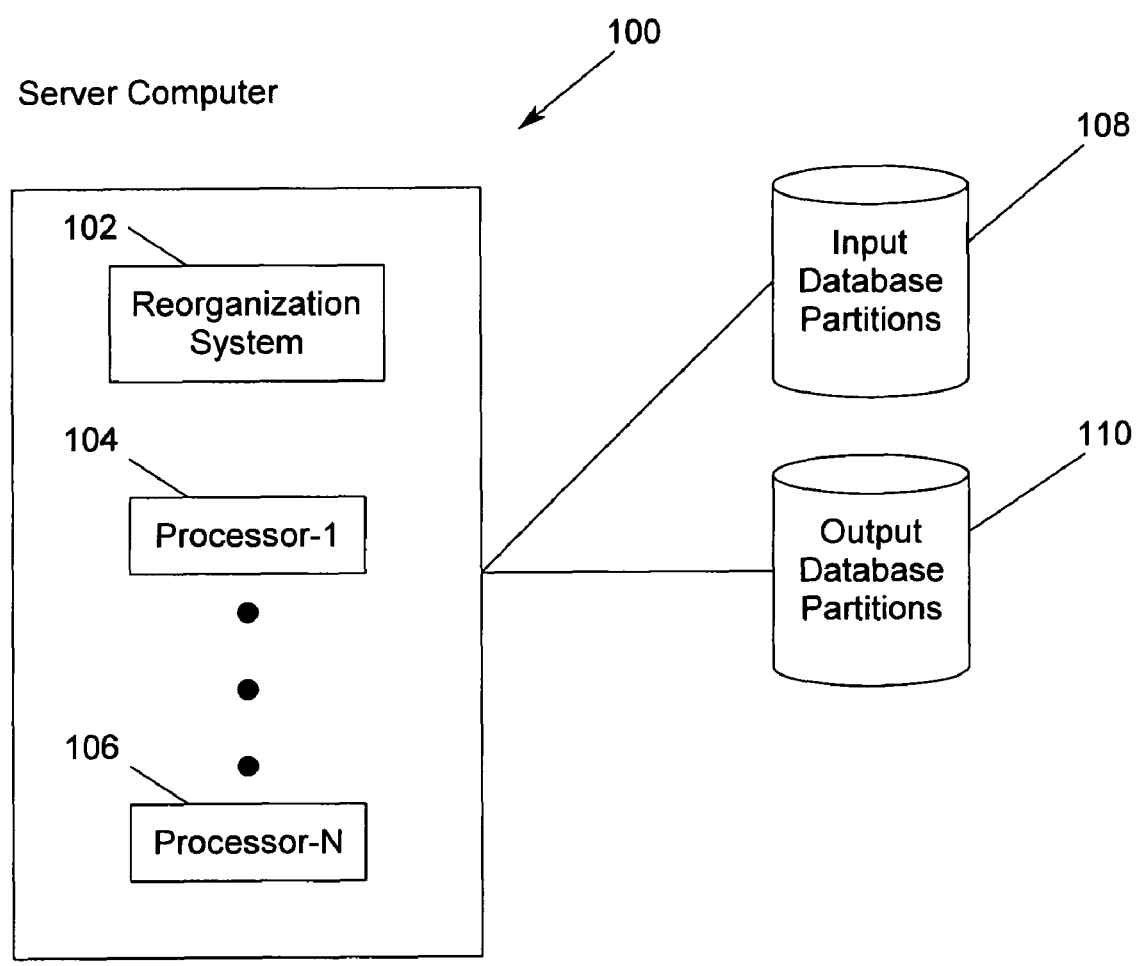
FIG. 1 is a diagram illustrating a computer hardware system that could be employed in accordance with the present invention.

FIG. 1 is a diagram illustrating a computer hardware environment that could be used in accordance with the present invention. A computer server 100 comprises a reorganization system 102 and multiple processors (Processor-1 104 and Processor-N 106). The computer server 100 is coupled to data stores, including data store 108, which stores input database partitions and data store 110, which stores output database partitions. The direction of the reorganization system 102 reads rows from the input 108 and writes reorganized rows to the output 110. Although data stores 108, 110 are illustrated at different data stores, it is to be understood that in some implementations data stores 108, 110 may be the same files.

Figure 2:
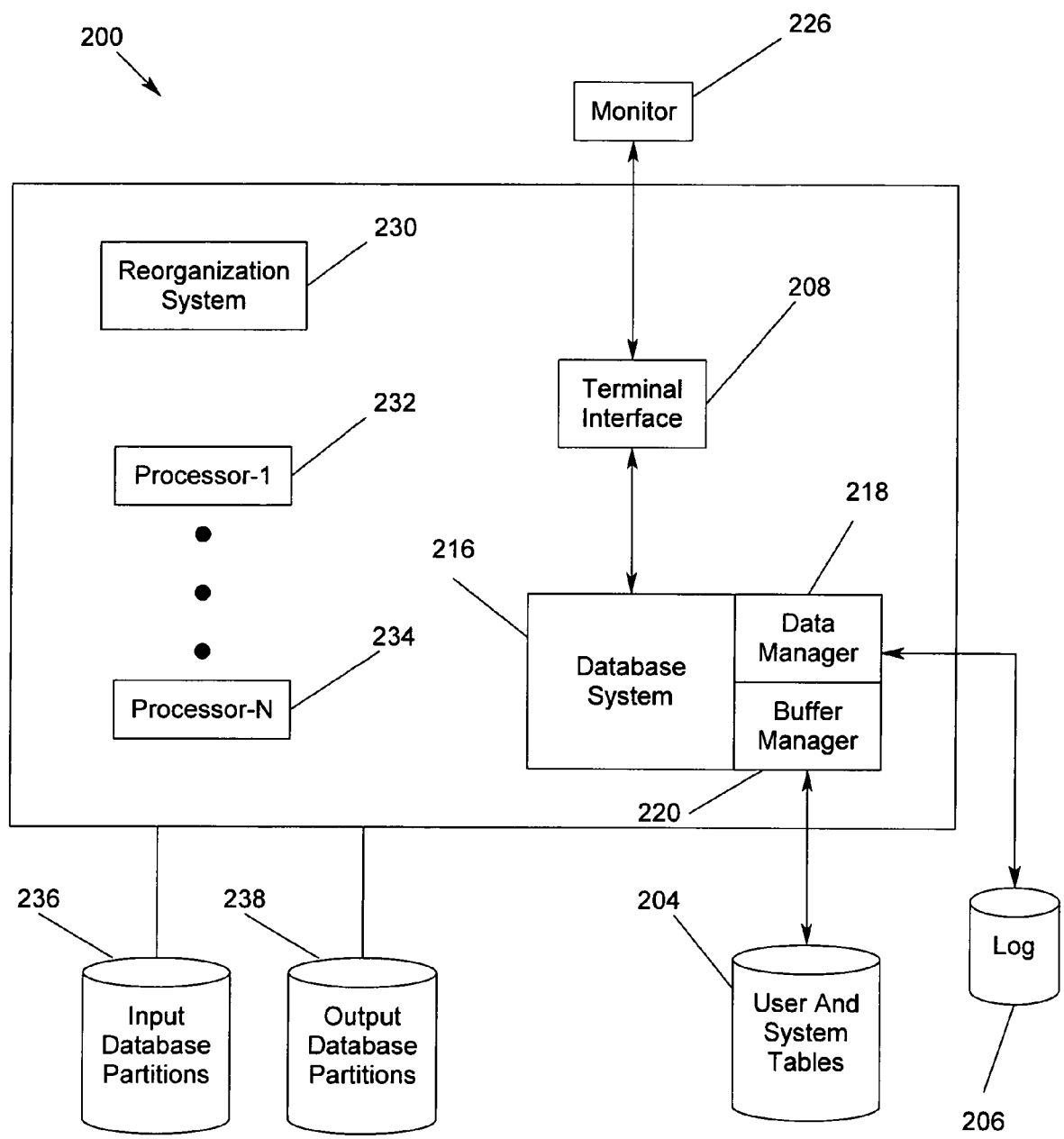
FIG. 2 is a diagram illustrating a computer hardware environment that adds further detail to the hardware environment of FIG. 1.

FIG. 2 is a diagram illustrating a computer hardware environment that adds further detail to the hardware environment of FIG. 1. In the environment, a computer system 200 is comprised of one or more processors 232, 234 coupled to one or more data storage devices 204 and 206 that store one or more relational databases in tablespaces. The data storage devices 204 and 206 may comprise a fixed or hard disk drive, a floppy disk drive, a CDROM drive, a tape drive, or other device.

Operators of the computer system 200 use a standard operator interface 208, such as IMS/DB/DC®, CICS®, TSO®, OS/390®, ODBC® or other similar interface, to transmit electrical signals to and from the computer system 200 that represent commands for performing various search and retrieval functions, termed queries, against the databases. In the present invention, these queries conform to the Structured Query Language (SQL) standard, and invoke functions performed by DataBase Management System (DBMS) software. The processors 232, 234 execute database system 216.

The SQL interface has evolved into a standard language for DBMS software and has been adopted as such by both the American National Standards Institute (ANSI) and the International Standards Organization (ISO). The SQL interface allows users to formulate operations on the tables either interactively, in batch files, or embedded in host languages, such as C and COBOL. SQL allows the user to manipulate the data.

The database system 216 and data manager 218 work to provide concurrency control to isolate users and to maintain data integrity. The data manager 218 controls the overall execution environment, including managing log data sets 206, gathering statistics, handling startup and shutdown, and providing management support.

The computer system 200 also includes a reorganization system 230. The processors 232, 234 also control reorganization system 230 that reorganizes the tables and associated indices stored on the data storage devices 204. This reorganization comprises a logical and/or physical arrangement of tables and associated indices. The computer server 200 is coupled to data stores, including data store 236, which stores input database partitions and data store 238, which stores output database partitions. The direction of the reorganization system 230 reads rows from the input 236 and writes reorganized rows to the output 238. An operator sitting at a monitor 226 may control the computer system 200 via operator interface 208.

Generally, the software, the reorganization system 230 and the instructions derived therefrom, are all tangibly embodied in a computer-readable medium, e.g. one or more of the data storage devices 204 and 206. Moreover, the database system 216, the reorganization system 230, and the instructions derived therefrom, are all comprised of instructions which, when read and executed by the computer system 200, causes the computer system 200 to perform the steps necessary to implement and/or use the present invention. Under control of an operating system, the DBMS software, the reorganization system 230, and the instructions derived therefrom, may be loaded from the data storage devices 204 and 206 through buffer manager 220 into a memory of the computer system 200 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the environment illustrated in FIG. 2 is not intended to limit the present invention. Indeed, those skilled in the art will recognize that other alternative hardware environments may be used without departing from the scope of the present invention.

Figure 3:
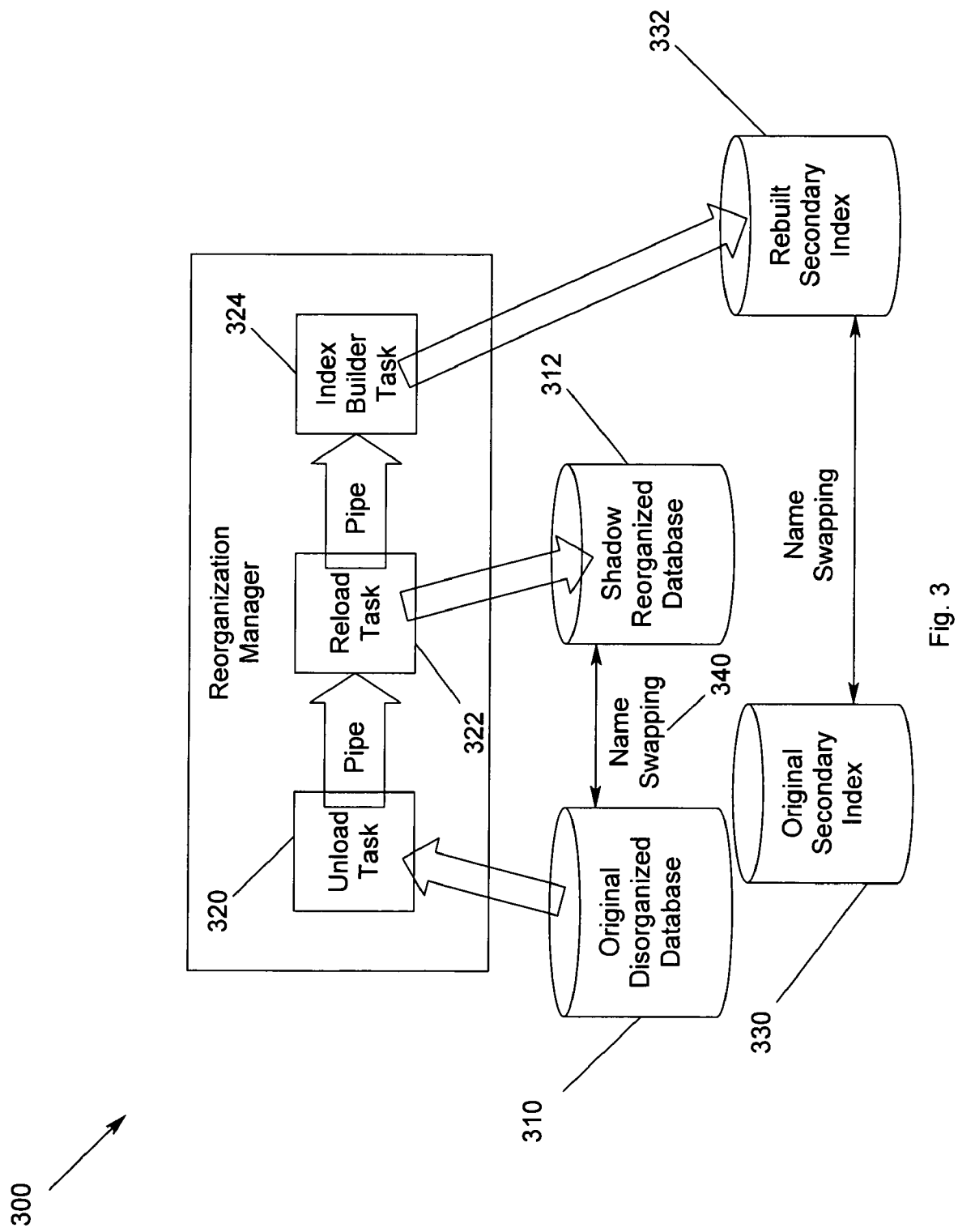
FIG. 3 illustrates a reorganization system for determining an optimal number of tasks during reorganization of a database system with memory and processor constraints according to an embodiment of the present invention.

FIG. 3 illustrates a reorganization system 300 for managing buffers during online reorganization of a database system according to an embodiment of the present invention. In FIG. 3, different data sets are used for the input database 310 and the output reorganized database 312. The output reorganized database 312 is called the shadow database. The original database 310 provides records to the unload task 320. Unloaded records are passed from the unload task 320 to the reload task 322 directly. Original secondary indexes 330 are provided to an index builder task 324. The index builder task 324 constructs the rebuilt secondary indexes 332 for the reorganized database 312 while the original database 310 is being reorganized. Parallel reorganization enables unload, reload, index builder, and image copy tasks to run concurrently. Because the original database 310 exists throughout the reorganization process, applications are allowed to have read access to the original database 310 during most of the reorganization process. The reorganization manger 300 enables read access to the original database 310 during the unload, reload, and index building processes and restricts the access to the original database 310 only during the post-reorganization processing. The shadow data sets in the shadow database 312 are renamed 340 with the original data set names after a successful reorganization. During reorganization, unload, reload, sort, and build processes may all be active at the same time. Thus, the amount of taskset calculation is constrained by the internal distribution of processes in addition to the memory and processor constraint.

Figure 4:
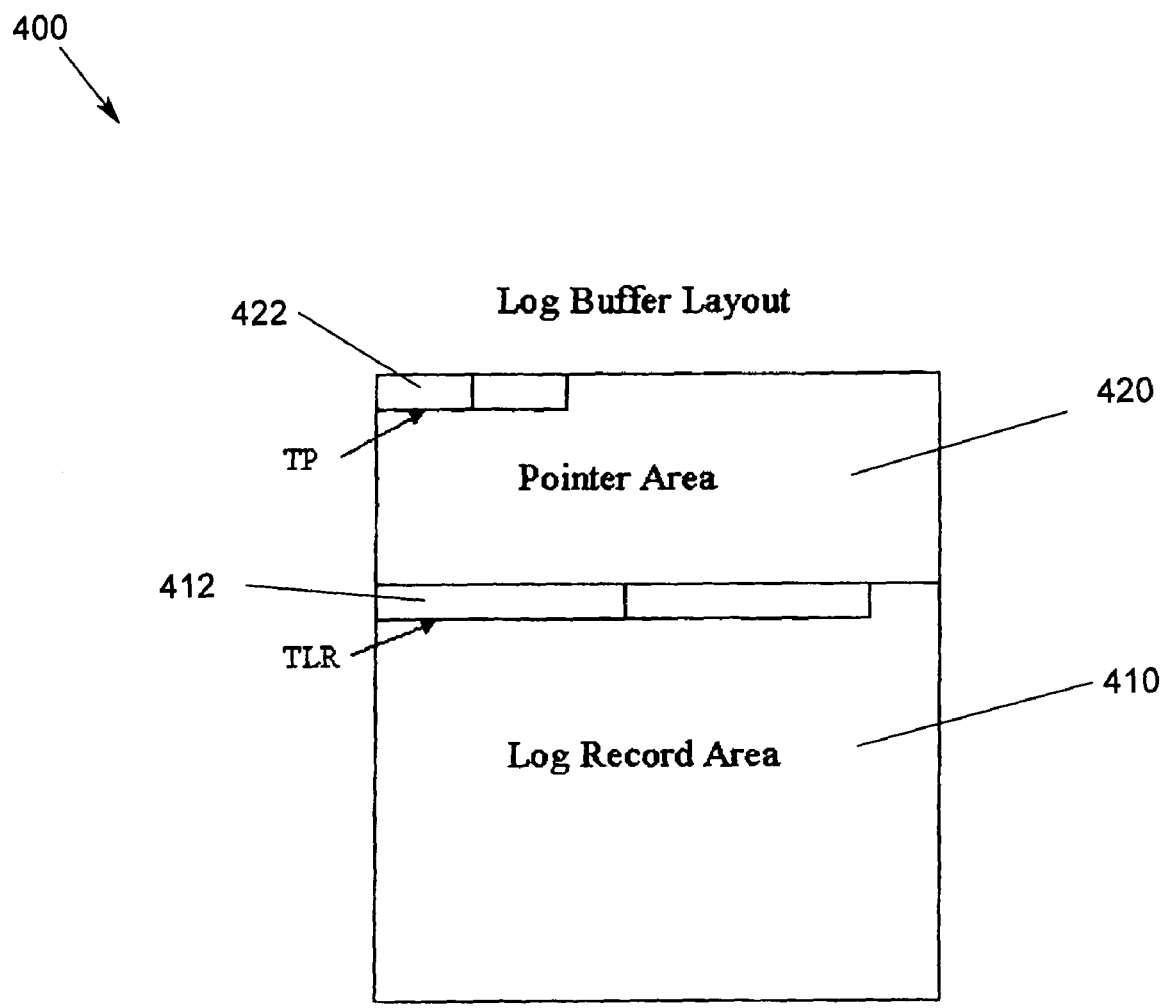
FIG. 4 illustrates a single fixed buffer used during a log apply process for online reorganization.

FIG. 4 illustrates a single fixed buffer 400 used during a log apply process for online reorganization. The buffer 400 includes a first 410 and second 420 area, wherein the first area is filled with log records 412 and the second area is filled with pointers 422 to the log records. Instead of sorting actual log records 412, to achieve better performance, the pointers 422 to the log records are sorted. Thus, the log is read to fill the buffer 400, and then the log records are sorted (by pointers). The log records are updated with new RID values. The log records are sorted again, and finally the log changes are applied.

As can be seen in FIG. 4, space is wasted in the buffer 400. The wasted space is a result of either the pointer area 420 filling up before the log record area 410 is full, or the log record area 410 filling up before the pointer area 420 is full. In either event, this causes the partially full buffer 400 to be processed while there are additional log records waiting to be read. The inefficient use of the buffer 400 means that additional log read iterations may be required, extending the elapsed time of the reorganization.

Figure 5:
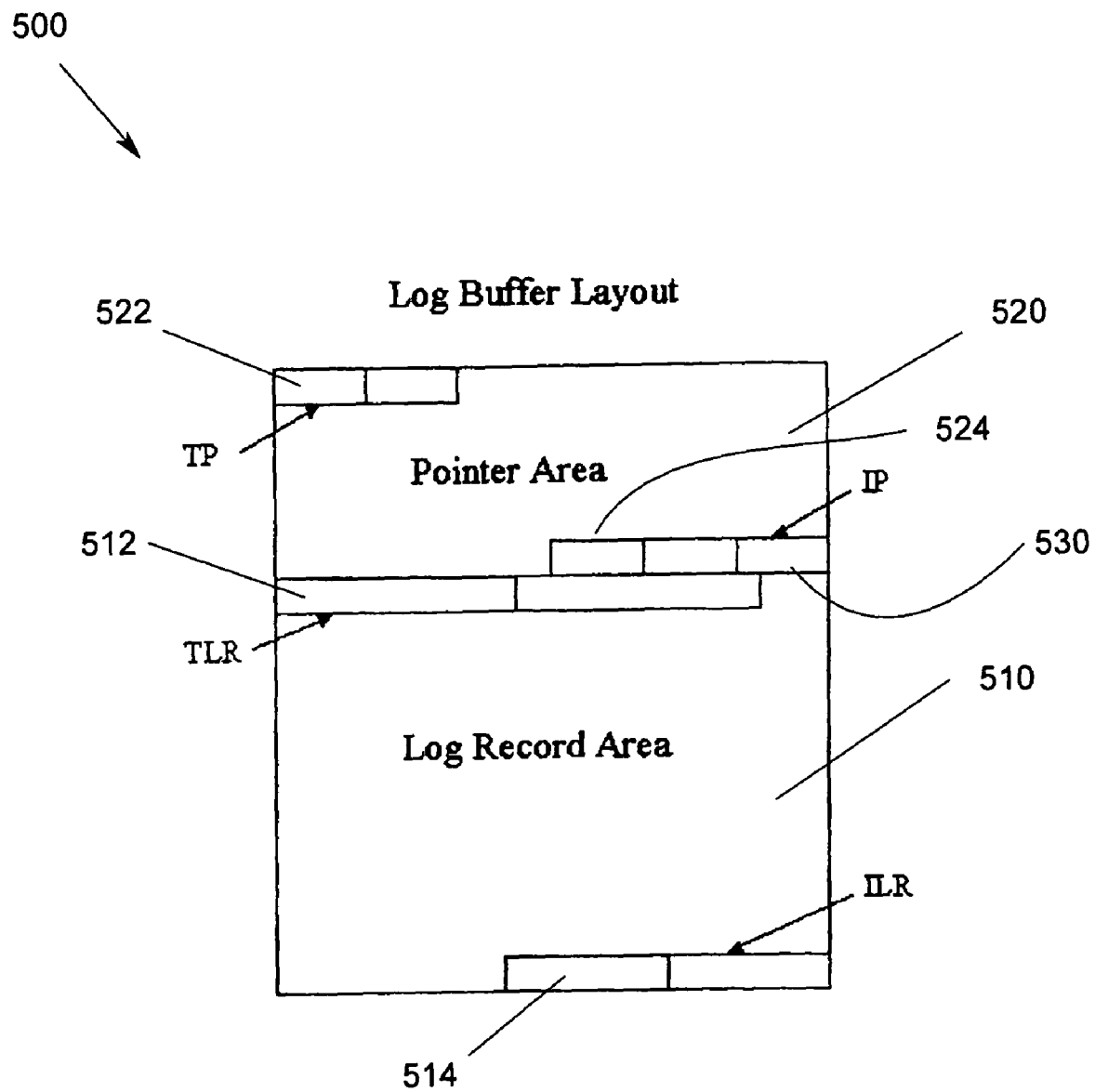
FIG. 5 illustrates a dynamic buffer that used during a log apply process for online reorganization according to an embodiment of the present invention.

FIG. 5 illustrates a dynamic buffer 500 that used during a log apply process for online reorganization according to an embodiment of the present invention. In FIG. 5, the allocation of each area 510, 520 is adapted according to the characteristics of the work to be done. Adaptive buffer utilization allows for less unused memory, and thus, fewer iterations and better performance during the log apply phase for an online reorganization.

In FIG. 5, the adaptive buffer 500 may include log records from multiple objects. Table log records 512 and index log records 514 are stored in the same area of buffer 500. The table space pointers 522 and index pointers 524 are stored in the same area of buffer 520. Thus, the adaptive buffer 500 is portioned out among all objects. The adaptive buffer efficiently buffers a table space and one or more non-partitioned index objects by dynamically adapting how the buffer 500 is utilized. The boundary 530 between the pointer area 520 and the log record area 510 is dynamic to allow more efficient utilization of the buffer 500. The boundary 530 is positioned by estimating where the boundary 530 should be placed so that the pointer area 520 gets full at the same time as the log record area 510. Dynamically positioning the boundary 530 results in optimal filling of the buffer 500 during each pass when compared with the fixed boundary approach, and thus, overall better utilization of the buffers.

Referring to FIG. 2 and FIG. 5, the buffer manager 220 may be used to keep track of the number of log entries for each object of interest in a give time frame. In addition, the reorganization system 230 captures the total number of bytes for log records by each object as it fills a buffer 500. An estimate can then be made for the ratio of buffer space needed for pointers versus actual log records. The partitioning of the buffer 500 can then be adapted in an attempt to have the pointer area 520 and log record area 510 become full at the same time.

An estimate for the space allocation during a log apply iteration may be calculated as follows:

$$TLR_{avg} \text{ (TLR bytes)}/\#TP,$$

wherein $TLR_{avg}$ refers to the table space log records average length and #TP refers to the number of table space record pointers. The index log records average length for NPI index n, $ILR_{avg\_n}$, is calculated as follows:

$$ILRavg\_n = (ILR_n \text{ bytes}) / \#IP_n,$$

wherein ILRn is the index log record for NPI index n and #IPn is the number of index log record pointers for NPI index n. Using the number of log entries per object that must be applied, an estimate of the total number of bytes needed for the next iteration may be calculated as follows:

Est. TP bytes=#TSLR*8 bytes per pointer

Est. IP bytes=sum(#ILR$_n$)*8 bytes per pointer

Est. TLR bytes=#TSLR*TLR$_{avg}$

Est. ILR$_n$ bytes=#ILR$_n$* ILR$_{avg\_n}$

Est. Total bytes=TP bytes+IP bytes+TLR bytes+sum (ILR$_n$) bytes where #TSLR is the number of table space log records to apply and #ILR$_n$ is the number of index log records to apply for NPI n. Once the total bytes are estimated for each area, a ratio can be calculated for the amount of pointer space needed as compared to the total space as follows:

Pointer Space Ratio (PSR)=(TP bytes+IP bytes)/Total bytes

The limit for the pointer will be set according to the pointer space ratio (PSR), or for a 10 MB buffer, the first PSR*10 MB of bytes are allocated as the area for pointers, and the rest is used for log records. Since the calculation depends on reading log records to get an actual number of bytes, the first iteration must be different because no log records have been read at that point. Therefore, for the first iteration, the space allocated for pointers will be a fixed size as commonly implemented. An alternative for the first iteration, according to an embodiment of the present invention, would be to estimate the number of bytes required for log records by using a constant multiplier times the average row length (or average index key length) for the table space in place of the TLR$_{avg}$ or ILR$_{avg\_n}$ in the above formulas.

The adaptive technique that sets the boundary 530 according to the characteristics of the data and changes made to the data during reorganization, better utilization of the buffer enables a more efficient reorganization that doesn't require as much space. The separate section for the table space pointers 522 and index pointers 524 allows separate sort tasks to run concurrently without any contention for the same area of memory. Log records 512 are separated from the index log records 514 so that separate tasks for translation and log apply can run concurrently without any contention for memory. The index log apply tasks only require reading of the buffer 500 so there can be multiple index log apply task executing concurrently without contention. Because the buffer is a fixed size, there may be multiple iterations to fill and apply log records from the buffers. The iterative nature of the log apply plus the adaptive algorithm to shift the pointer/log record boundary 530 means that the buffer 500 is adapting to the number and size of the log records on each iteration. Moreover, although the discussion of the adaptive buffer above highlights log apply during a reorganization of a table space that has non-partitioned indexes, the adaptive buffer also works when there are no non-partitioned indexes, and therefore no index log records applied.

Figure 6:
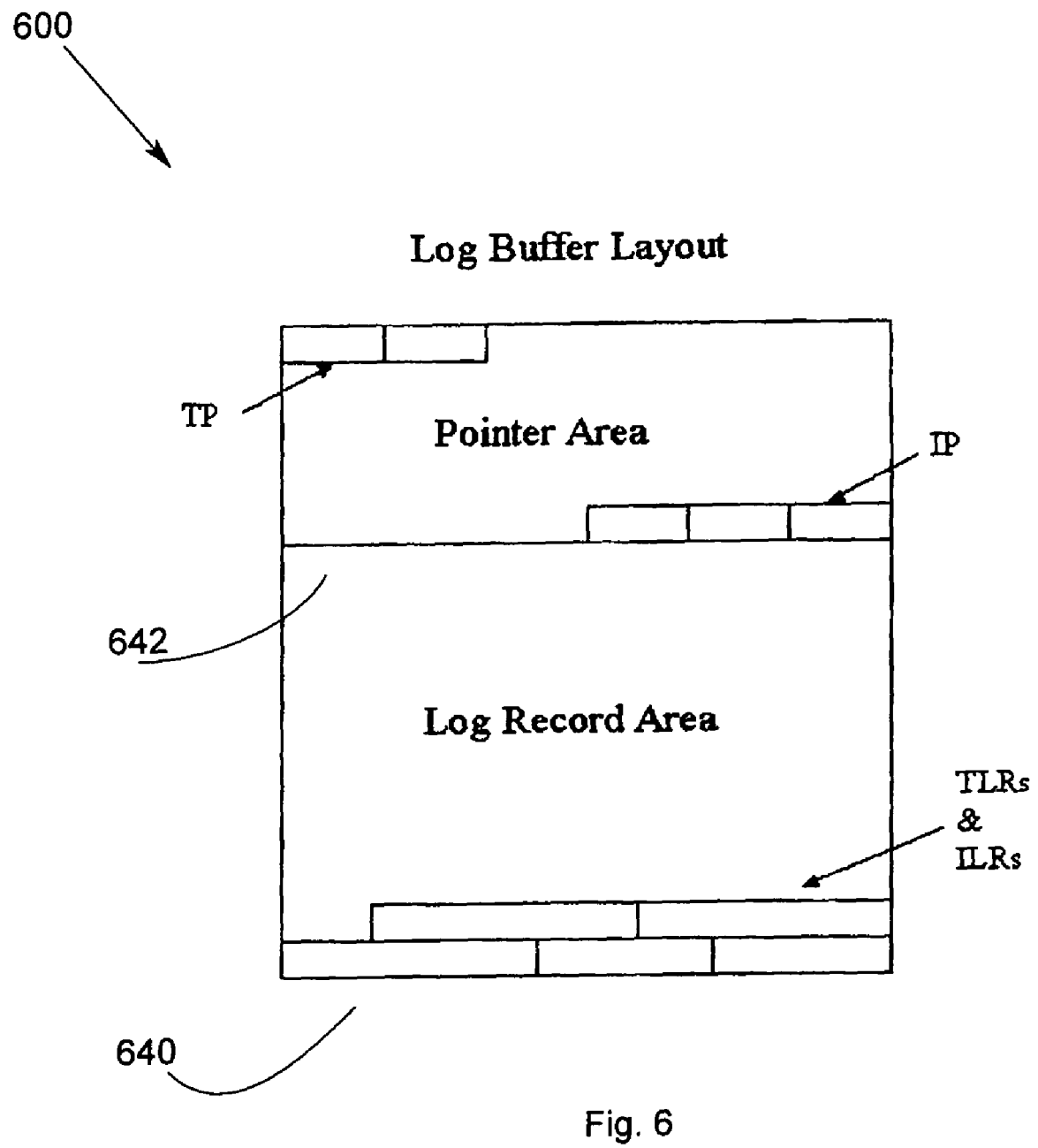
FIG. 6 illustrates another dynamic buffer according to an embodiment of the present invention.

FIG. 6 illustrates another dynamic buffer 600 according to an embodiment of the present invention. As described above with reference to FIG. 5, the adaptive buffer allows for the various log apply functions, e.g., log reading, object sorting, RID translation, and log apply, to be separated into concurrently running tasks without contention on the same space in the buffer. However, benefits may still be achieved by combining tasks into a common task. The benefit of having separate tasks has diminishing returns as the number of tasks increases, and it's more important to have separate buffer filling and log apply tasks than separate sort and translation tasks. A simplified adaptive approach may combine the log reading, sorting, and log translation into a single task, and then provide separate tasks for the actual log apply for each object (table space and each NPI).

In FIG. 6, the adaptive buffer 600 is filled by single serial task from bottom 640 to top 642 with the table space log records and index log records of non-partitioned indexes. The pointers to these records are filled in the same manner. Subsequently, the same serial task sort the table space log records according to old RID, translate the table space log records, sorts the table space log records according to new RID and LRSN and sorts the index space log records according to index, key, and LRSN. After the filler task completes theses steps, separate log apply tasks, 1 per object, then can concurrently read and apply the log records from a single buffer without read/write contention.

As mentioned above, it may be necessary to have a "global" index that covers all of the partitions for purposes of enforcing unique values or providing efficient data retrieval. Multiple tasks may be used in conjunction with multiple buffers for retrieval and processing of the log records for the data and global index. Depending on the level of activity of manipulation of the data partitions being reorganized and the data partitions not being reorganized, the data apply tasks or the index apply tasks may complete the processing of their current buffer significantly quicker than the other set.

Figure 7:
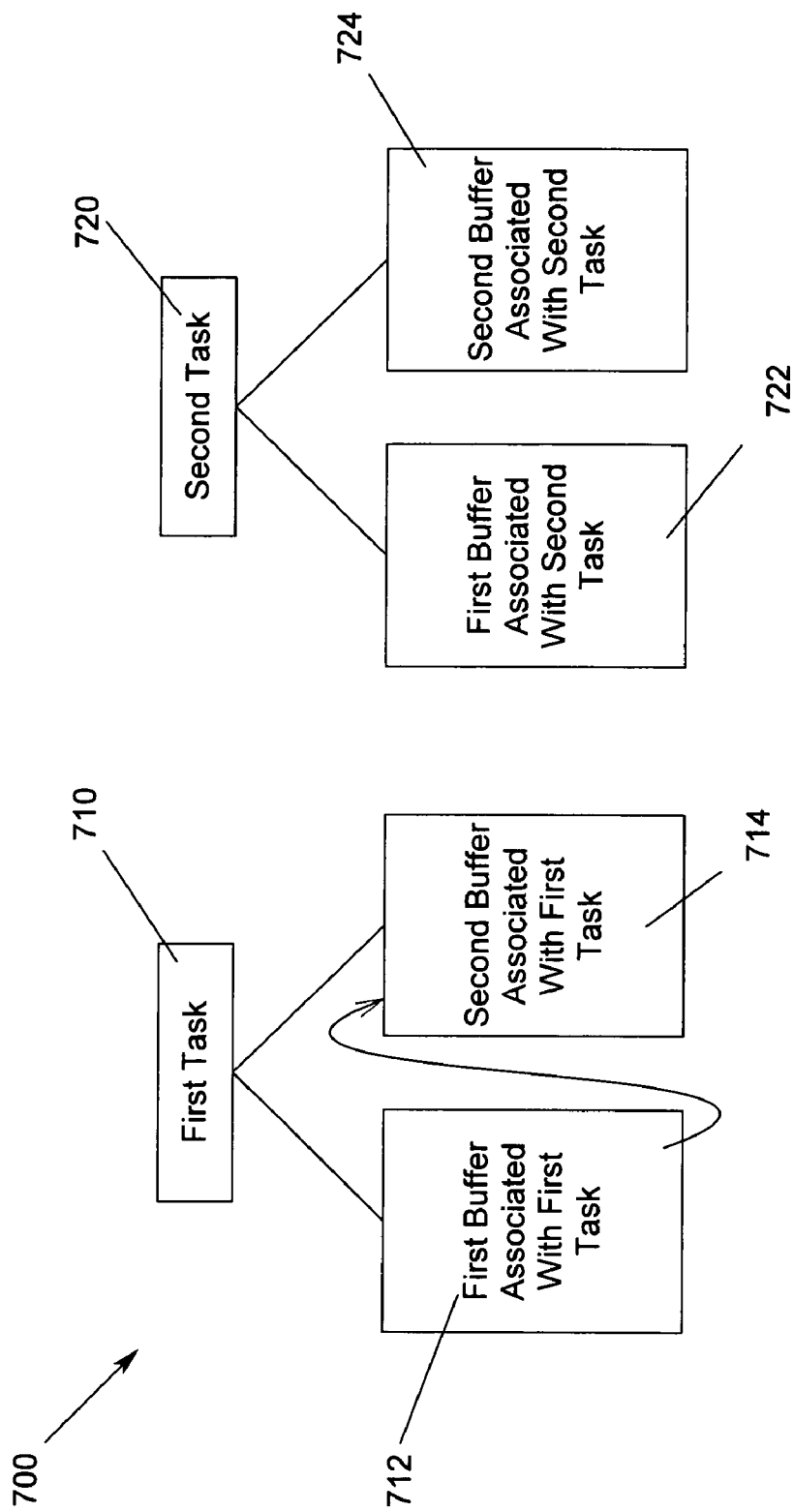
FIG. 7 illustrates a dual buffer system for handling separate tasks during online reorganization.

FIG. 7 illustrates a dual buffer system 700 for handling separate tasks during online reorganization. In FIG. 7, two sets of tasks 710, 720 are used, wherein a first set of tasks 710 may be used for processing data log records and a second set of tasks 720 may be used for processing index log records. In FIG. 7, each set of tasks 710, 720 is provided with two buffers 712/714, 722/724. Both sets of tasks 710, 720 may be initiated to begin processing the initial contents of their buffers 712/714, 722/724.

Figure 8A:
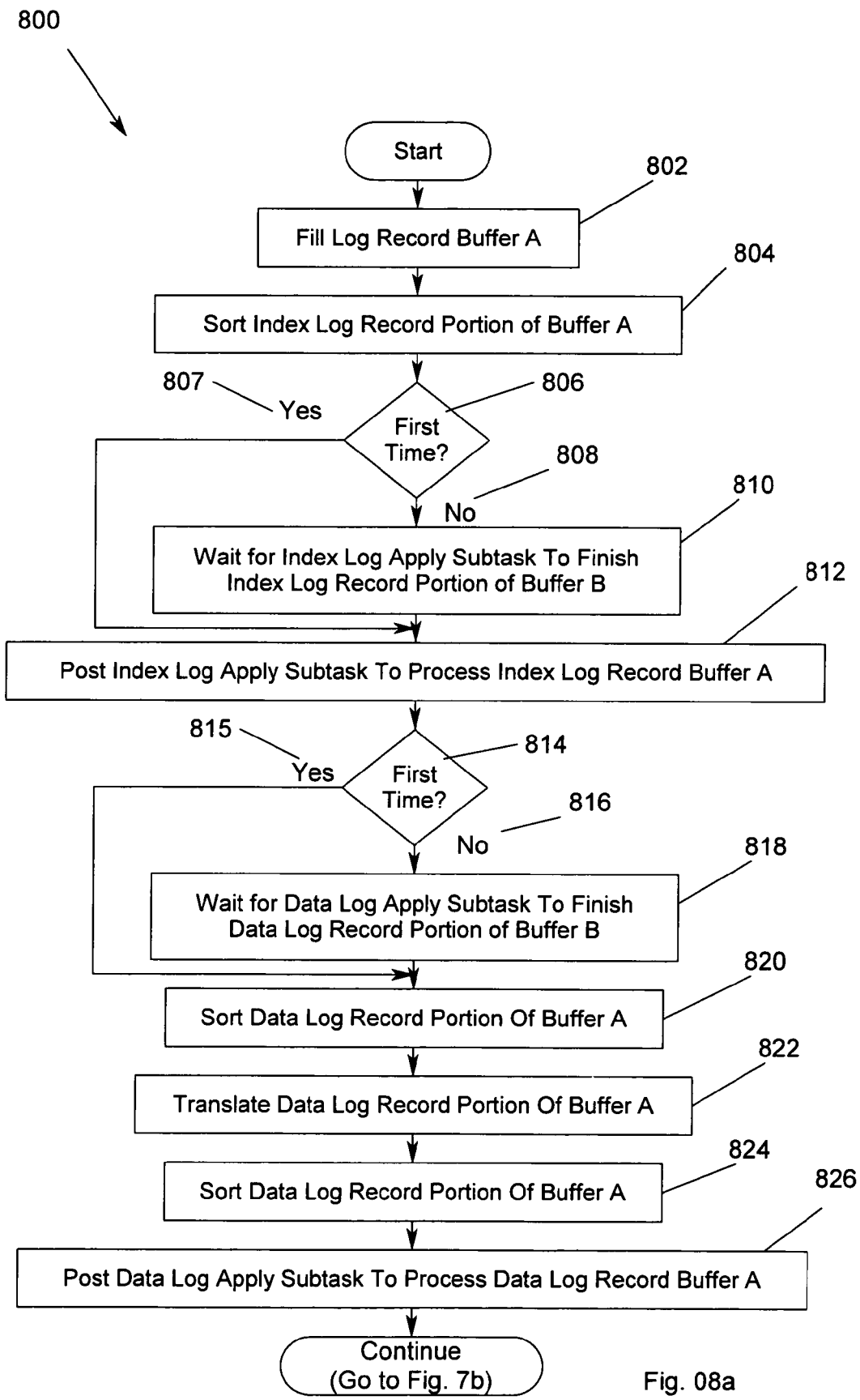
FIGS. 8a-b illustrate a flow chart of a method for processing log apply subtask using multiple buffers for retrieval and processing of the log records for the data and global index.
Figure 8B:
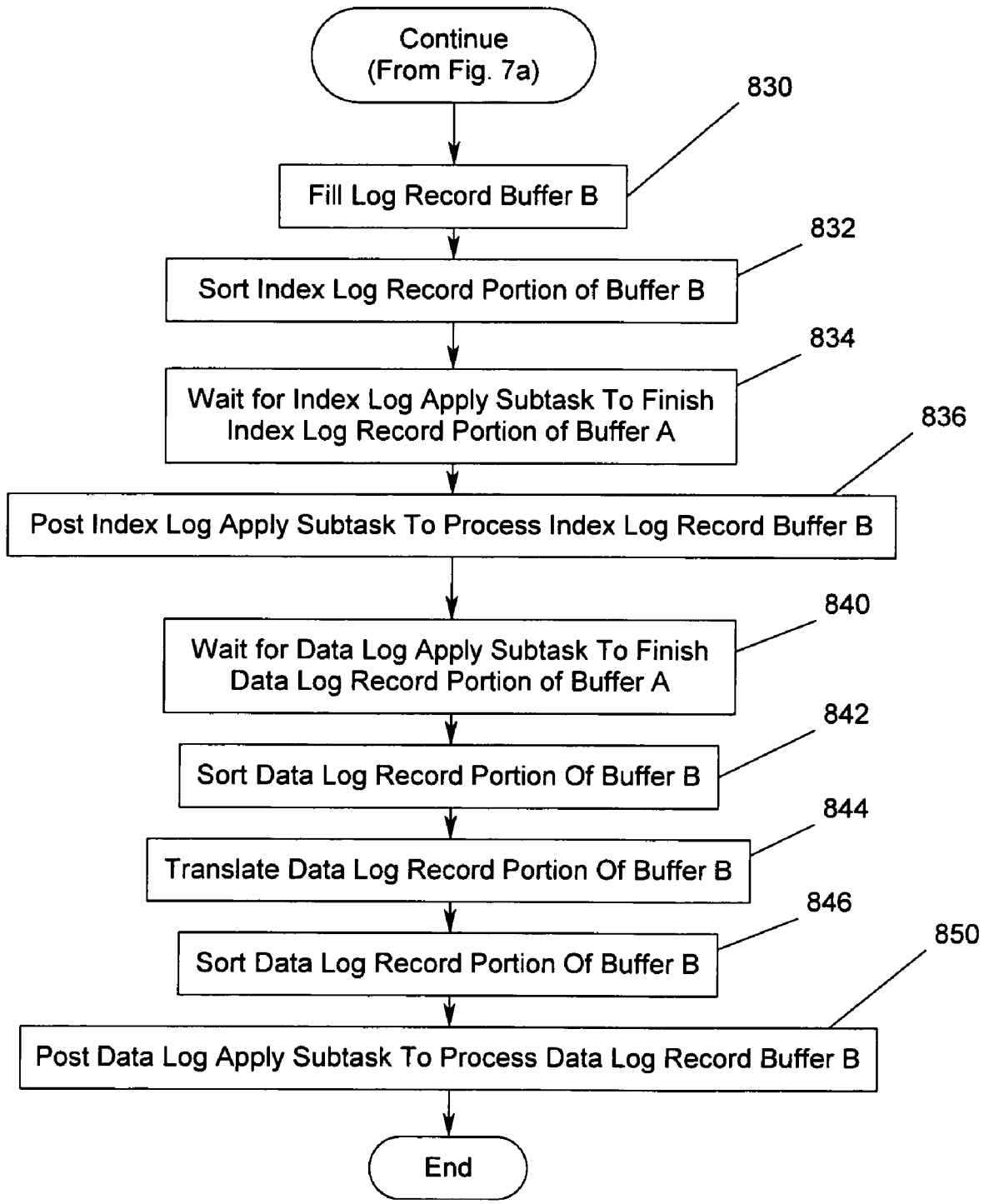

FIGS. 8a-b illustrate a flow chart 800 of a method for processing log apply subtask using multiple buffers for retrieval and processing of the log records for the data and global index. In FIG. 8a, while retrieving additional log records, the first buffer, A, is filled with log records 802. Then, the index log record portion of A is sorted 804. A determination is made whether this is the first time through the process 806. If not 808, the process waits for index log apply subtask to finish processing the index log record portion of a second buffer, B 810. Thereafter, or when this is the first time through the process 807, index log apply subtasks are posted to process the index log record portion of buffer A 812. Another determination is made whether this is the first time through the process 814. In this instance, if this is not the first time through the process 816, the procedure waits for the data log apply subtasks for the data log record portion of buffer B to complete 818. Thereafter, or when this is the first time through the process 815, the data log record portion of buffer A is sorted 820. The data log portion of buffer A is then translated 822 and the data log record portion of buffer A is sorted again 824. The data log apply subtask is posted to process the data log record portion of buffer A 826.

Turning to FIG. 8b, buffer B is filled 830 and the index log record portion of buffer B is sorted 832. The process waits for index log apply subtask to finish processing the index log record portion of a first buffer, A 834. Index log apply subtasks are posted to process the index log record portion of buffer B 836. The procedure waits for the data log apply subtasks for the data log record portion of buffer A to complete 840. Thereafter, the data log record portion of buffer B is sorted 842. The data log portion of buffer B is then translated 844 and the data log record portion of buffer B is sorted again 846. The data log apply subtask is posted to process the data log record portion of buffer B 850. However, the process described with reference to FIGS. 8a-b can result in the data apply tasks or the index apply tasks completing the processing of their current buffer significantly quicker than the other task set. This results in inefficient use of the buffers.

Figure 9A:
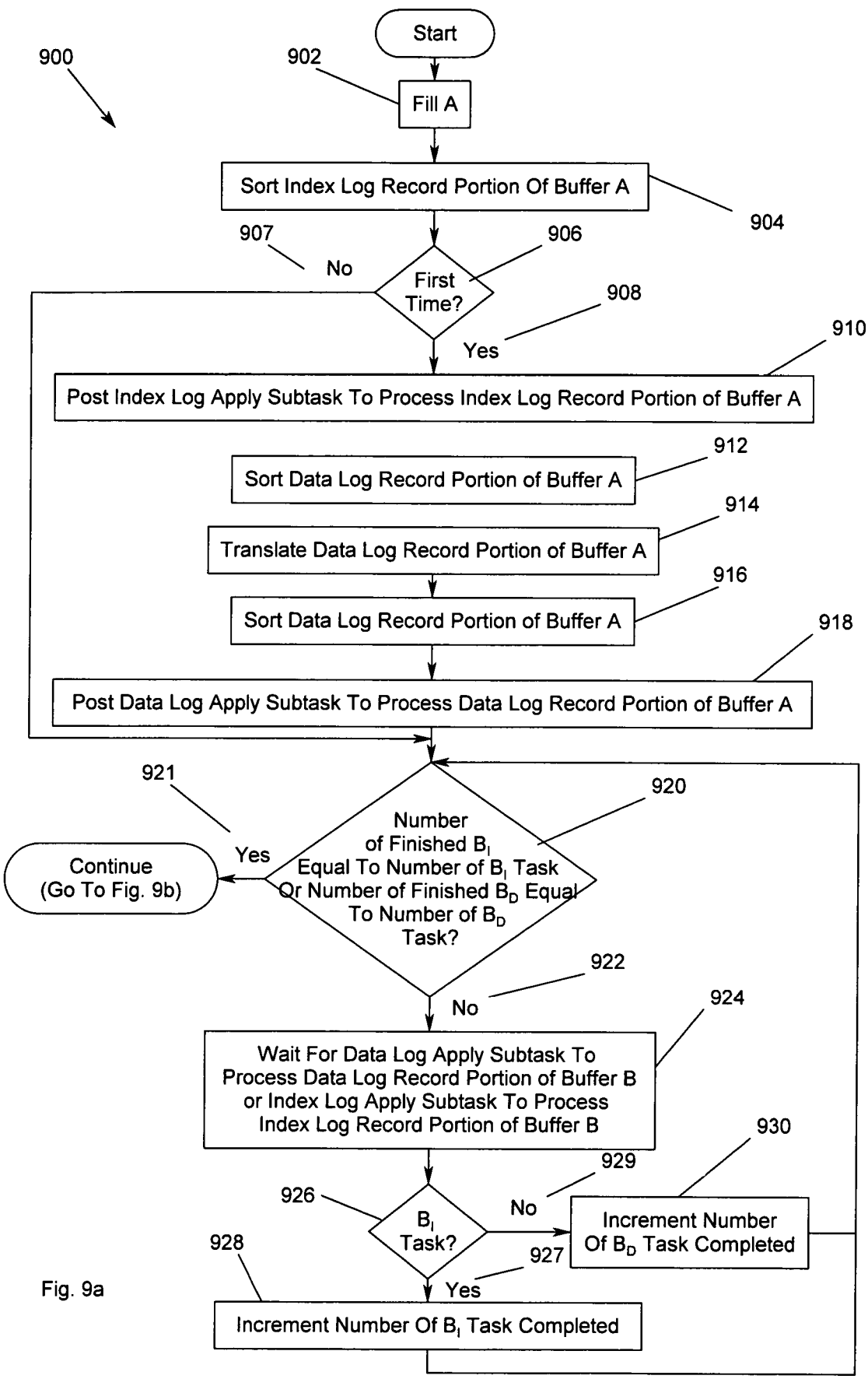
FIGS. 9a-9c illustrate a detailed flow chart of a method for adaptive task switching during log apply for online reorganization according to an embodiment of the present invention.

FIGS. 9a-9d illustrate a detailed flow chart 900 of a method for adaptive task switching during log apply for online reorganization according to an embodiment of the present invention. In FIG. 9a, log records continue to be processed and buffer A is filled with log records 902. The index log record portion of buffer A is sorted 904. A determination is made whether this is the first time through the process 906. If yes 908, the process posts index log apply subtasks to process index log record portion of buffer A 910. Then, the data log record portion of buffer A is sorted 912, the data log record portion of buffer A is translated 914 and the data log record portion of buffer A is sorted again 916. The process posts data log apply subtasks to process data log record portion of buffer A 918. Thereafter or when this is not the first time through the process 907, a determination is made whether the number of finished index log record portion of buffer B tasks is equal to the number of index log record portion of buffer B tasks or the number of finished data log record portion of buffer B tasks is equal to the number of data log record portion of buffer B tasks 920. If not 922, the process waits for index log apply subtask/data log apply subtask task to finish index log record portion of buffer B or data log record portion of buffer B 924. A determination is then made whether the task is an index log record portion of buffer B task 926. If yes 927, then the number of finished index log record portion of buffer B tasks is incremented 928. If not 929, the number finished data log record portion of buffer B tasks is incremented 930.

Figure 9B:
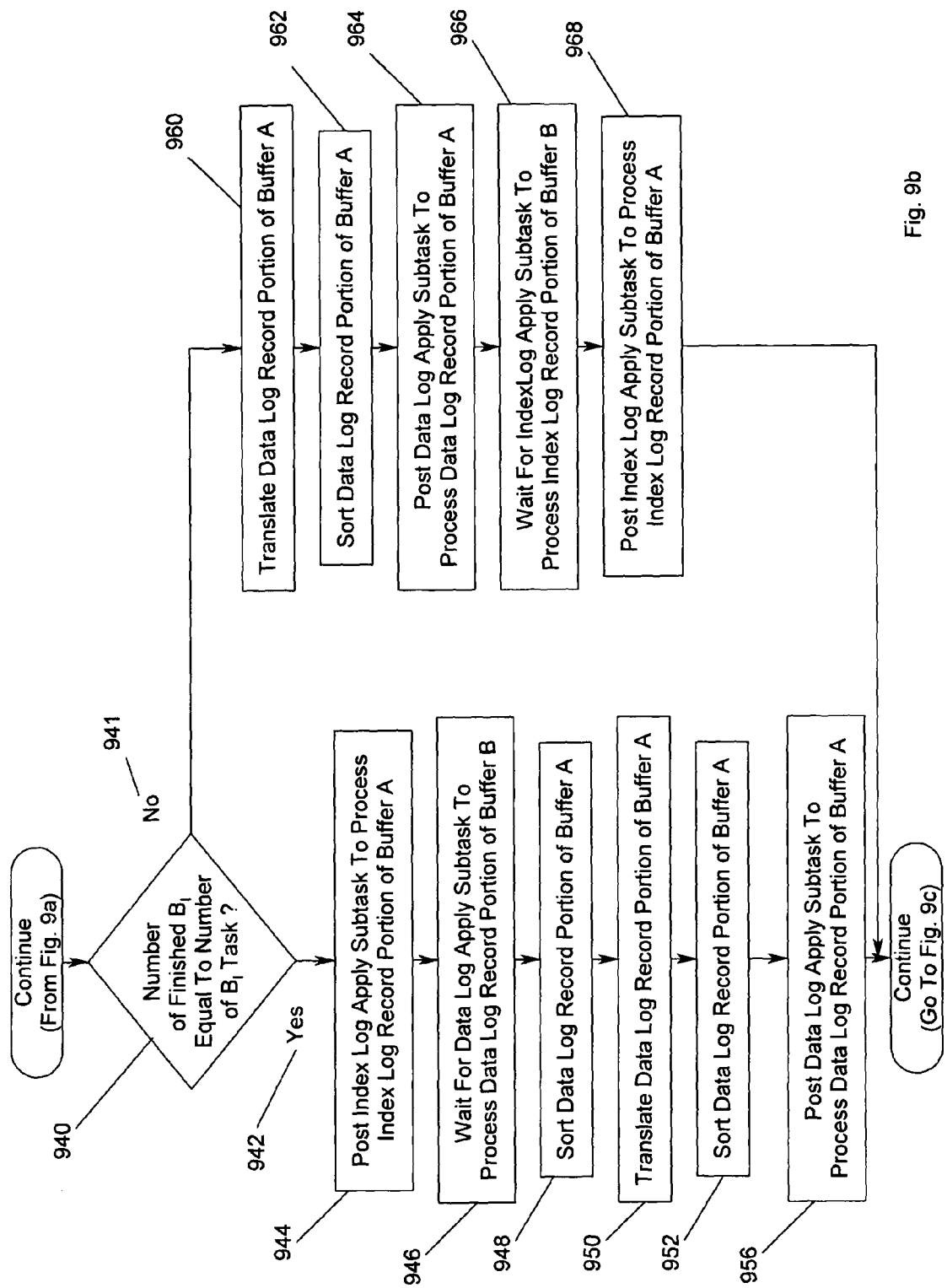

Referring to FIG. 9b, when the number of finished index log record portion of buffer B tasks is equal to the number of index log record portion of buffer B tasks or the number of finished data log record portion of buffer B tasks is equal to the number of data log record portion of buffer B tasks 921, a determination is made whether the number of finished index log record portion of buffer B tasks is equal to the number of index log record portion of buffer B tasks 940. If yes 942, then the process posts index log apply subtasks to process index log record portion of buffer A 944. Then, the process waits for the data log apply subtask to finish data log record portion of buffer B 946. The data log record portion of buffer A is then sorted 948, translated 950 and sorted again 952. The process then posts data log apply subtask to process data log record portion of buffer A 956.

If the number of finished index log record portion of buffer B tasks is not equal to the number of index log record portion of buffer B tasks 941, the data log record portion of buffer A is translated 960 and the data log record portion of buffer A is sorted 962. The process then posts a data log apply subtask to process data log record portion of buffer A 964. The process then waits for an index log apply subtask to finish an index log record portion of buffer B 966. The process then posts an index log apply subtask to process index log record portion of buffer A 968.

Figure 9C:
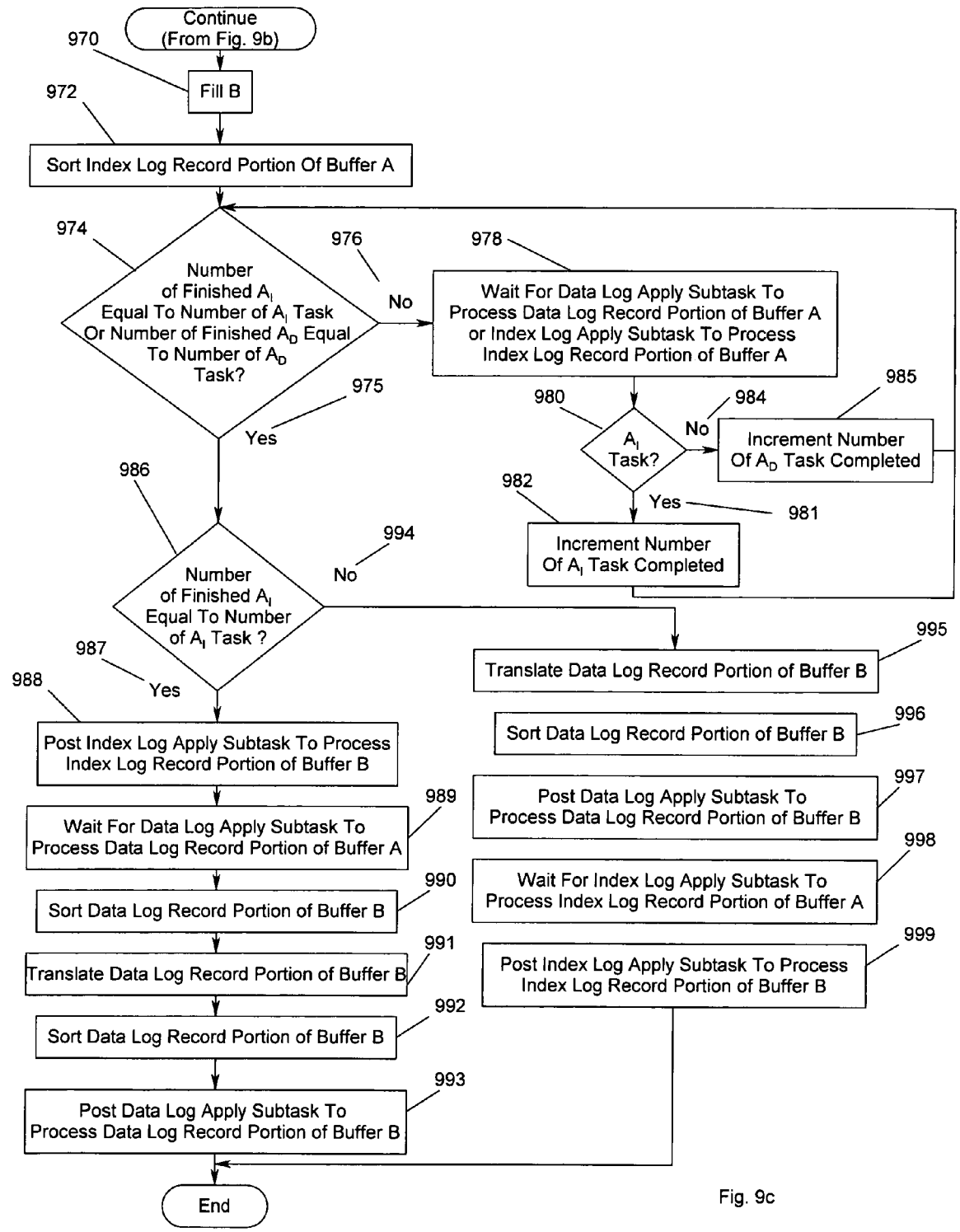

Now referring to FIG. 9c, buffer B is filled 970. The index log record portion of buffer B is sorted 972. Next, a determination is made whether the number finished index log record portion of buffer A tasks is equal to the number index log record portion of buffer A tasks or whether the number of finished data log record portion of buffer A tasks is equal to the number data log record portion of buffer A Tasks 974. If not 976, the process waits for index log apply subtask/data log apply subtask task to finish the index log record portion of buffer A or the data log record portion of buffer A 978. A determination is then made whether an index log record portion of buffer A task is being processed 980. If yes 981, then the number of finished index log record portion of buffer A tasks is incremented 982. If not 984, the number of finished data log record portion of buffer A tasks is incremented 985.

When the number finished index log record portion of buffer A tasks is equal to the number index log record portion of buffer A tasks or whether the number of finished data log record portion of buffer A tasks is equal to the number data log record portion of buffer A tasks 975, a determination is made whether the number of finished index log record portion of buffer A tasks is equal to the number of index log record portion of buffer A tasks 986. If yes 987, then the process posts an index log apply subtask to process index log record portion of buffer B 988. The process waits for data log apply subtasks finish the data log record portion of buffer A 989. The data log record portion of buffer B is sorted 990, translated 991 and sorted again 992. The process then posts a data log apply subtask to process data log record portion of buffer B 993. If the number of finished index log record portion of buffer A tasks is not equal to the number of index log record portion of buffer A tasks 994, the data log record portion of buffer B is translated 995. The data log record portion of buffer B is sorted 996. The process then posts a data log apply subtask to process data log record portion of buffer B 997. The process then waits for the index log apply subtask to finish index log record portion of buffer A 998. The process then posts an index log apply subtask to process index log record portion of buffer B 999.

FIG. 10 is a flow chart of the method for adaptive task switching during log apply for online reorganization according to an embodiment of the present invention. A first process begins processing first task records located in a first buffer associated with first task set and a second task begins processing second set records located in first buffer associated with second task set 1002. The first task completes the processing of records in first buffer associated with first task 1010. The first task begins processing records located in second buffer associated with first task set without waiting for second task to complete processing records of first buffer associated with second task set 1016. The first task begins processing records located in second buffer associated with first task 1020. The first task waits until the second task completes the processing of records located in first buffer associated with second task set 1026. The first task refills the first buffer associated with first task set and the first buffer associated with second task set 1030. A determination is made whether the first task or the second task completes processing records in its first buffer next 1036. The task completing processing records in its first buffer first begins to refill the second buffer for both tasks and then begins to process its second buffer 1040. A determination is made whether the first task or the second task completes processing records in its second buffer next 1046. The task completing processing records in its second buffer first begins to refill the first buffer for both tasks and then begins processing its second buffer 1050.

According to an embodiment of the present invention, on each pair of log buffers, the ratio of data log records and index log records may vary as well as the time to process the buffer of log records. Thus, an embodiment of the present invention will automatically adapt to the changing processing times. Both the index and data parts of the buffer are sorted and then process waits for both the data log apply subtasks and index log apply subtasks to finish. If all the data log apply subtasks finish first, the data part is translated and sorted. The data log apply subtasks are posted and then the process waits for the index log apply subtasks to finish. If all the index log apply subtasks finish first, they are posted to process the index part of the buffer. The process then waits for the rest of the data log apply subtasks to finish:

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A program storage device, comprising:
   program instructions executable by a processing device to perform operations for managing buffers during online reorganization, the operations comprising:
   providing an adaptive buffer having a dynamically adjustable boundary between log records and pointers associated with the log records, the adaptive buffer for processing the log records and pointers associated with the log records during online reorganization of a database; and
   adaptive switching between a first and a second task during the processing of the log records comprising data log records and index log records during the online reorganization of the database, further comprising:
   begin processing, by a first task, records located in first buffer associated with first task set and processing, by a second task, records located in first buffer associated with second task set;
   completing by first task the processing of records in first buffer associated with first task;
   begin processing by first task, records located in second buffer associated with first task set without waiting for second task to complete processing records of first buffer associated with second task set;
   completing processing records located in second buffer associated with first task by first task;
   waiting, by first task, until second task completes the processing of records located in first buffer associated with second task set;
   refilling, by first task, the first buffer associated with first task set and the first buffer associated with second task set;
   determining whether the first task or the second task completes processing records in its first buffer next;
   beginning to refill second buffer for both tasks by the task determined to next complete processing of its first buffer; and
   processing, by task determined to next complete processing its first buffer, second buffer of task determined to next complete processing its first buffer.

2. The program storage device of claim 1, wherein providing an adaptive buffer having a dynamically adjustable boundary, the adaptive buffer for processing log records and pointers associated with the log records during online reorganization of a database further comprises dynamically positioning a boundary in the buffer, the boundary separating the adaptive buffer into a pointer area and a log record area.

3. The program storage device of claim 2, wherein dynamically positioning a boundary in the buffer further comprises filling the log record area from a single direction.

4. The program storage device of claim 2, wherein dynamically positioning a boundary in the buffer further comprises filling the log record area beginning at a first location in the log record area using table space log records and at a second location in the log record area using index log records.

5. The program storage device of claim 2, wherein dynamically positioning a boundary in the buffer further comprises filling the log record area with table space log records and index log records.

6. The program storage device of claim 2, wherein dynamically positioning a boundary in the buffer further comprises filling the pointer area with table space log record pointers and index log record pointers.

7. The program storage device of claim 2, wherein dynamically positioning a boundary in the buffer further comprises estimating a ratio of anticipated buffer space for pointers versus buffer space actually used for log records.

8. The program storage device of claim 2, wherein dynamically positioning a boundary in the buffer further comprises processing log apply functions using concurrently running tasks without contention on the same space in the buffer for each log apply function.

9. The program storage device of claim 2, wherein dynamically positioning a boundary in the buffer further comprises combining log apply tasks into a common task.

10. The program storage device of claim 9, wherein combining log apply tasks into a common task further comprises combining log reading, sorting, and log translation into a single task and providing separate tasks for a log apply for each object.

11. A program storage device comprising:
    program instructions executable by a processing device to perform operations for managing buffers during online reorganization, the operations comprising:
    providing an adaptive buffer having a dynamically adjustable boundary between log records and pointers associated with the log records, the adaptive buffer for processing the log records and pointers associated with the log records during online reorganization of a database; and
    adaptive switching between a first and a second task during the processing of the log records comprising data log records and index log records during the online reorganization of the database, further comprising:
    begin processing, by a first task, records located in first buffer associated with first task set and processing, by a second task, records located in first buffer associated with second task set;
    completing by first task the processing of records in first buffer associated with first task;
    begin processing by first task, records located in second buffer associated with first task set without waiting for second task to complete processing records of first buffer associated with second task set;
    completing processing records located in second buffer associated with first task by first task;

waiting, by first task, until second task completes the processing of records located in first buffer associated with second task set;
refilling, by first task, the first buffer associated with first task set and the first buffer associated with second task set;
determining whether the first task or the second task completes processing records in its second buffer next;
beginning to refill first buffer for both tasks by the task determined to first complete processing of its second buffer; and
processing, by task determined to next complete processing its second buffer, first buffer of task determined to next complete processing its second buffer.

12. A program storage device, comprising:
program instructions executable by a processing device to perform operations for managing buffers during online reorganization, the operations comprising:
begin processing, by a first task, records located in first buffer associated with first task set and processing, by a second task, records located in first buffer associated with second task set;
completing by first task the processing of records in first buffer associated with first task;
begin processing by first task, records located in second buffer associated with first task set without waiting for second task to complete processing records of first buffer associated with second task set;
completing processing records located in second buffer associated with first task by first task;
waiting, by first task, until second task completes the processing of records located in first buffer associated with second task set;
refilling, by first task, the first buffer associated with first task set and the first buffer associated with second task set;
determining whether the first task or the second task completes processing records in its first buffer next;
beginning to refill second buffer for both tasks by the task determined to next complete processing of its first buffer; and
processing, by task determined to next complete processing its first buffer, second buffer of task determined to next complete processing its first buffer.

13. The program storage device of claim 12, further comprising:
determining whether the first task or the second task completes processing records in its second buffer next;
beginning to refill first buffer for both tasks by the task determined to first complete processing of its second buffer; and
processing, by task determined to next complete processing its second buffer, first buffer of task determined to next complete processing its second buffer.

14. The program storage device of claim 13, wherein first task comprises processing data log records.

15. The program storage device of claim 13, wherein first task comprises processing index log records.

16. The program storage device of claim 13, wherein first buffer comprises an index log record portion.

17. The program storage device of claim 13, wherein second buffer comprises a data log record portion.

18. An apparatus for managing buffers during online reorganization, comprising:
a computer having a data store coupled thereto, wherein the data store stores data; and
one or more computer programs, performed by the computer, for beginning processing, by a first task, records located in first buffer associated with first task set and processing, by a second task, records located in first buffer associated with second task set, completing by first task the processing of records in first buffer associated with first task, beginning processing by first task records located in second buffer associated with first task set without waiting for second task to complete processing records of first buffer associated with second task set, completing processing records located in second buffer associated with first task by first task, waiting, by first task, until second task completes the processing of records located in first buffer associated with second task set and refilling, by first task, the first buffer associated with first task set and the first buffer associated with second task set, determining whether the first task or the second task completes processing records in its first buffer next, beginning to refill second buffer for both tasks by the task determined to next complete processing of its first buffer; and processing, by task determined to next complete processing its first buffer, second buffer of task determined to next complete processing its first buffer.

19. An apparatus for managing buffers during online reorganization, comprising:
a data storage device for storing data in a database;
a computer, coupled to the data storage device, for executing instructions for reorganizing the database, the computer including:
first task means for beginning to process records located in first buffer associated with first task means; and
second task means for processing records located in first buffer associated with second task means;
wherein the first task means completes the processing of records in a first buffer associated with first task means, processes records located in second buffer associated with first task means without waiting for second task means to complete processing records of first buffer associated with second task means, completes processing records located in second buffer associated with first task means, wait until second task completes the processing of records located in first buffer associated with second task means, refills the first buffer associated with first task means and the first buffer associated with second task means, determines whether the first task or the second task completes processing records in its first buffer next, begins to refill second buffer for both tasks by the task determined to next complete processing of its first buffer; and processes, by task determined to next complete processing its first buffer, second buffer of task determined to next complete processing its first buffer.

20. A method of adaptive switching between tasks during online reorganization of a database, comprising:
begin processing, by a first task, records located in first buffer associated with first task set and processing, by a second task, records located in first buffer associated with second task set;
completing by first task the processing of records in first buffer associated with first task;
begin processing by first task, records located in second buffer associated with first task set without waiting for second task to complete processing records of first buffer associated with second task set;
completing processing records located in second buffer associated with first task by first task; waiting, by first task, until second task completes the processing of records located in first buffer associated with second task set; and refilling, by first task, the first buffer associated with first task set and the first buffer associated with second task set, determining whether the first task or the second task completes processing records in its first buffer next, beginning to refill second buffer for both tasks by the task determined to next complete processing of its first buffer; and processing, by task determined to next complete processing its first buffer, second buffer of task determined to next complete processing its first buffer.

* * * * *